(12) United States Patent
Mrozek

(10) Patent No.: US 10,822,018 B2
(45) Date of Patent: Nov. 3, 2020

(54) STEERING APPARATUS FOR USE WITH VEHICLES

(71) Applicant: Ford Global Technologies, LLC, Dearborn, MI (US)

(72) Inventor: Robert Marcel Mrozek, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 211 days.

(21) Appl. No.: 16/007,544

(22) Filed: Jun. 13, 2018

(65) Prior Publication Data

US 2019/0382046 A1    Dec. 19, 2019

(51) Int. Cl.
  *B62D 5/04*       (2006.01)
  *F16H 37/02*      (2006.01)
  *F16H 25/22*      (2006.01)
  *F16H 25/20*      (2006.01)

(52) U.S. Cl.
  CPC ......... *B62D 5/0424* (2013.01); *B62D 5/0448* (2013.01); *F16H 25/2219* (2013.01); *F16H 37/02* (2013.01); *F16H 2025/2081* (2013.01); *F16H 2025/2096* (2013.01)

(58) Field of Classification Search
  CPC . B62D 5/0424; B62D 5/0448; F16H 25/2219; F16H 37/02; F16H 2025/2081; F16H 2025/2096
  USPC ...................................................... 180/444
  See application file for complete search history.

(56) References Cited

U.S. PATENT DOCUMENTS

| 7,477,036 | B2 | 1/2009 | Koike et al. |
| 8,297,401 | B1* | 10/2012 | Schneider ............... F16H 7/023 180/443 |
| 8,327,972 | B1* | 12/2012 | Schneider ............... F16H 7/023 180/443 |
| 9,845,106 | B2 | 12/2017 | Bodtker et al. |
| 2002/0148673 | A1* | 10/2002 | Menjak ................ B62D 5/0424 180/444 |
| 2005/0121251 | A1* | 6/2005 | Ueno .................... B62D 5/0409 180/444 |
| 2005/0205342 | A1* | 9/2005 | Tatewaki ............. B62D 5/0424 180/444 |
| 2006/0156839 | A1 | 7/2006 | Ueno et al. |
| 2007/0082547 | A1* | 4/2007 | Komoto ................ F16H 57/041 439/587 |
| 2007/0209862 | A1* | 9/2007 | Budaker ............... B62D 5/0427 180/444 |

(Continued)

FOREIGN PATENT DOCUMENTS

| FR | 2853613 | 7/2006 |
| JP | 2007131034 | 5/2007 |
| JP | 2013193713 | 9/2013 |

*Primary Examiner* — Jacob D Knutson
(74) *Attorney, Agent, or Firm* — Ray Coppiellie; Hanley, Flight & Zimmerman, LLC

(57) ABSTRACT

Methods, apparatus, systems and articles of manufacture for a steering apparatus for use with vehicles are disclosed. An example apparatus includes a housing for a vehicle steering system, a motor, an actuator, and a rack disposed in the housing, the motor to provide a torque to the actuator via a belt to translate the rack relative to the housing, and a first gear disposed between the motor and the actuator, the first gear to transfer the torque from the motor to the actuator when the belt does not provide the torque.

20 Claims, 5 Drawing Sheets

(56) References Cited

U.S. PATENT DOCUMENTS

| | | | |
|---|---|---|---|
| 2015/0298722 A1* | 10/2015 | Witte | B62D 5/003 |
| | | | 180/407 |
| 2015/0360716 A1 | 12/2015 | Dagli et al. | |
| 2017/0029017 A1* | 2/2017 | Pattok | B60T 7/042 |
| 2017/0057541 A1* | 3/2017 | Bodtker | B62D 1/20 |

* cited by examiner

STEERING APPARATUS FOR USE WITH VEHICLES

FIELD OF THE DISCLOSURE

This disclosure relates generally to vehicles and, more particularly, to steering apparatus for use with vehicles.

BACKGROUND

Some vehicles include power assisted steering (PAS) systems to assist a driver in steering the vehicle, for example, via motors (e.g., electric motors), pumps, fluid valves, actuators, etc. In particular, a PAS system changes a steering angle of road wheels based on driver input to a steering wheel, thereby reducing driver effort required to steer the vehicle as well as improve vehicle handling and/or maneuverability.

BRIEF DESCRIPTION OF THE DRAWINGS

The figures are not to scale. In general, the same reference numbers will be used throughout the drawing(s) and accompanying written description to refer to the same or like parts

DETAILED DESCRIPTION

Steering apparatus for use with vehicles are disclosed. Some vehicles include power-assisted steering (PAS) systems to assist a driver in steering a vehicle, for example, via motors (e.g., electric motors), pumps, fluid valves, actuators, etc. In some power-assisted steering systems, a belt (e.g., a v-belt, a timing belt, etc.) may be operatively coupled between two shafts to transfer torque therebetween, for example, in response to rotation of the steering wheel. After extended periods of use, the belt may wear, tear, break, slip, and/or otherwise disengage from the two shafts leading to failure. Such belt failure may cease the transfer of torque between the two shafts and, thus, may result in loss of steering and/or damage to the vehicle.

In examples disclose herein, a gear (e.g., an idler gear) may be operatively disposed between a motor and an actuator and, thus, may transfer a torque from the motor to the actuator when a belt is not transferring sufficient torque between pulleys associated with the motor and actuator. For example, the belt may experience a failure (e.g., wears, tears, breaks, slips, and/or otherwise disengages from the motor and/or actuator) resulting in a loss of steering. The idler gear acts as a redundant power transfer mechanism to maintain steering control in the event of a failure of the belt.

Figure 1:
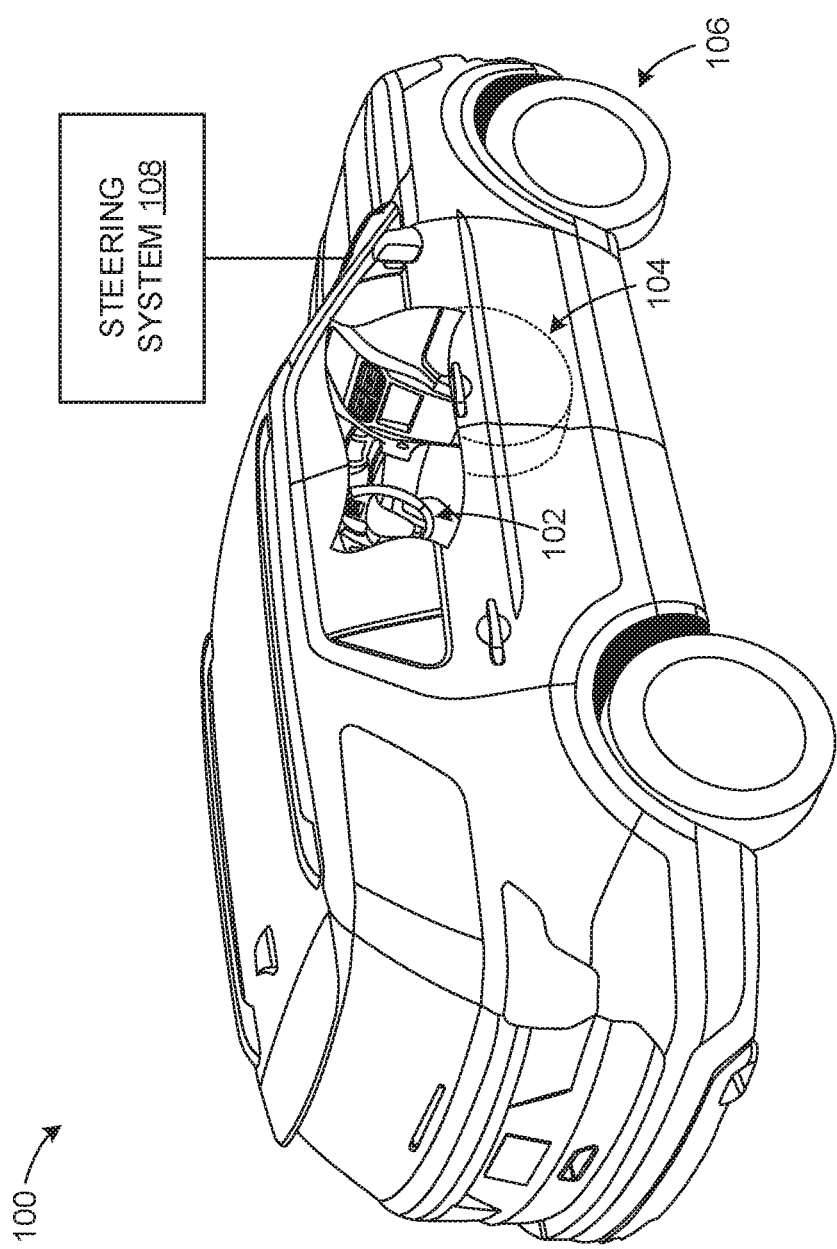
FIG. 1 is a schematic illustration of an example vehicle in which examples disclosed herein may be implemented.

FIG. 1 is a schematic illustration of an example vehicle (e.g., a car, a truck, a sport utility vehicle (SUV), etc.) 100 in which examples disclosed herein may be implemented.

The vehicle 100 of FIG. 1 includes an example steering wheel 102 and example road wheels 104, 106.

To implement steering control of the road wheels 104, 106, the steering wheel 102 of FIG. 1 is operatively coupled to the road wheels 104, 106 via an example steering system 108 (shown in FIG. 2) such as, for example, a PAS system, an electric power-assisted steering (EPAS) system, an active steering system, etc. In particular, a driver of the vehicle 100 provides user input to the steering system 108 by rotating the steering wheel 102, thereby causing the road wheels 104, 106 to rotate and/or change steering angle. While the example of FIG. 1 depicts the example vehicle 100 as having front wheel steering functionality, in other examples, the vehicle 100 may be implemented with all-wheel steering functionality or any other appropriate type of steering implementation.

Figure 2:
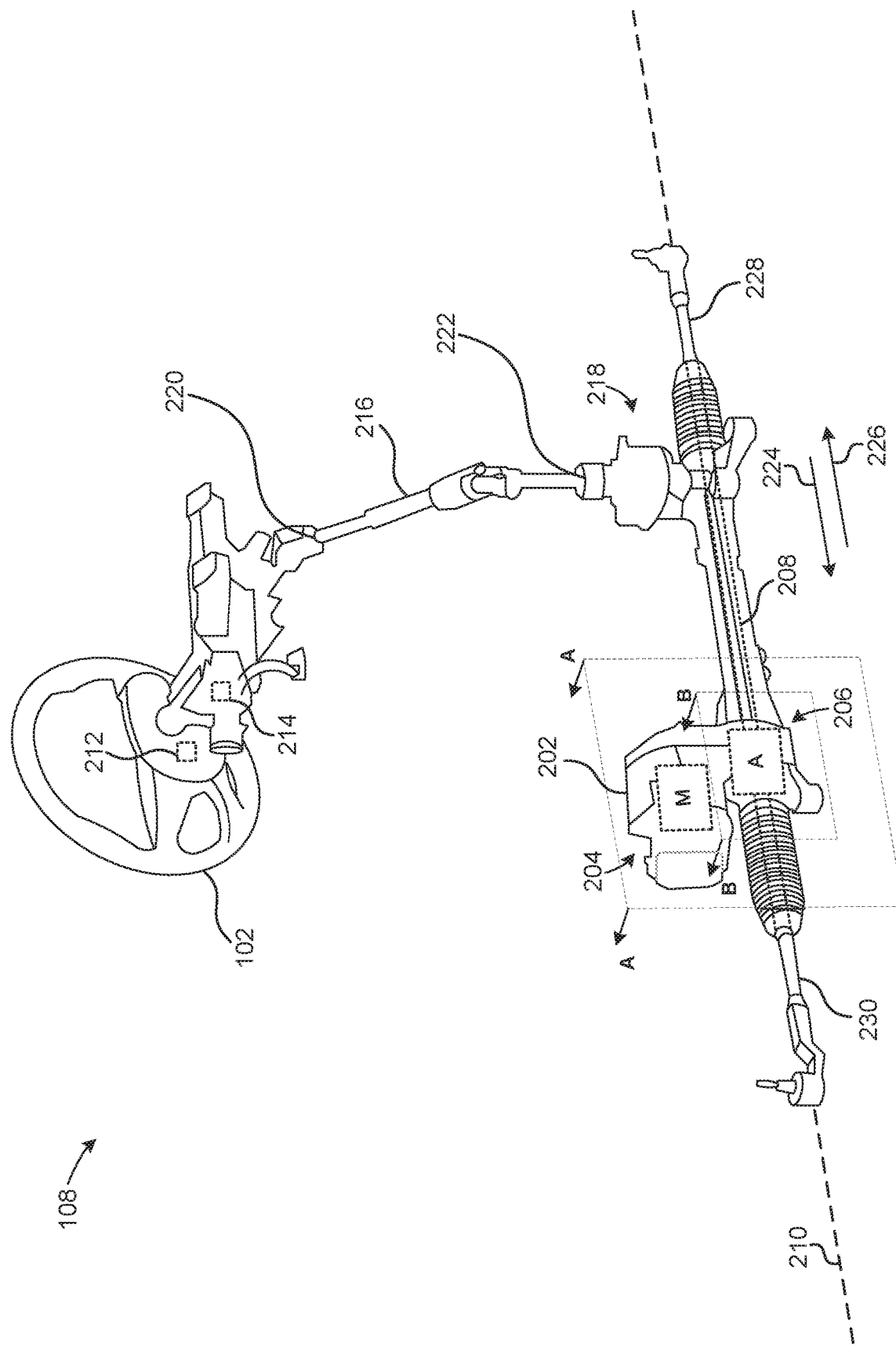
FIG. 2 is a detailed view of an example steering system of the vehicle of FIG. 1.

FIG. 2 is a detailed view of the aforementioned steering system 108 shown in FIG. 1. According to the illustrated example of FIG. 2, the steering system 108 includes an example housing 202, an example motor (e.g., an electric motor) 204, an example actuator (e.g., a rotary actuator and/or a linear actuator) 206, and an example rack 208. The motor 204, the actuator 206, and the rack 208 are disposed in the housing 202. In particular, the motor 204 is operatively coupled to the rack 208 via the actuator 206 to control a position of the rack 208. For example, in response to rotation of the steering wheel 102, the motor 204 generates a torque and provides the torque to the actuator 206 (e.g., via a belt operatively coupled to the motor 204 and the actuator 206), thereby causing the rack 208 to move in and out of the housing 202 along a longitudinal axis 210 of the rack 208. In this manner, the steering system 108 aids a driver in steering the vehicle 100 by reducing driver effort required to turn the road wheels 104, 106.

The motor 204 is communicatively coupled to one or more electronic control units (ECUs) 212 of the vehicle 100 and/or the steering system 108 to receive control commands or data, one of which is shown that is coupled to the steering wheel 102 in this example. In particular, the ECU(s) 212 direct the motor 204 to generate torque in response to user input provided to the steering wheel 102. As such, the steering wheel 102 is similarly communicatively coupled to the ECU(s) 212 to provide position data (e.g., a rotational position, a rotational velocity, etc.) thereto. For example, one or more example sensors (e.g., a torque sensor, a position sensor, etc.) 214 are operatively couple to the steering wheel 102 and/or a steering shaft 216 to obtain the position data and/or provide the position data to the ECU(s).

According to the illustrated example of FIG. 2, the steering wheel 102 is operatively coupled to the rack 208 via the steering shaft 216 and an example steering gear 218 to control a position of the rack 208 along with the motor 204. The steering shaft 216 of FIG. 2 extends from the steering wheel 102 to the steering gear 218 to transfer torque therebetween. For example, a first end 220 of the steering shaft 216 is coupled to a portion of the steering wheel 102 and a second end 222 of the steering shaft 216 is coupled to a portion of the steering gear 218.

The steering gear 218 of FIG. 2 receives a torque from the steering shaft 216 and imparts the torque on the rack 208, thereby moving the rack in the direction(s) 224, 226. The steering gear 218 includes a pinion gear, such as a helical gear (e.g., a worm gear), having teeth that engage helical grooves (e.g., teeth) of the rack 208.

To change a steering angle of the road wheels 104, 106, the rack 208 is operatively coupled to the road wheels 104, 106. As shown in FIG. 2, the rack 208 extends through the housing 202 to receive example tie rods 228, 230. In particular, each of the tie rods 228, 230 of FIG. 2 is movably coupled to a portion of a suspension system (e.g., a steering knuckle) of the vehicle 100 that is associated with the road wheels 104, 106. As such, as the rack 208 translates in the first direction 224 or the second direction 226 opposite the first direction 224, the road wheels 104, 106 turn in their respective directions. Each of the first and second direction 224, 226 of FIG. 2 is substantially parallel to the longitudinal axis 210 of the rack 208.

Figure 3:
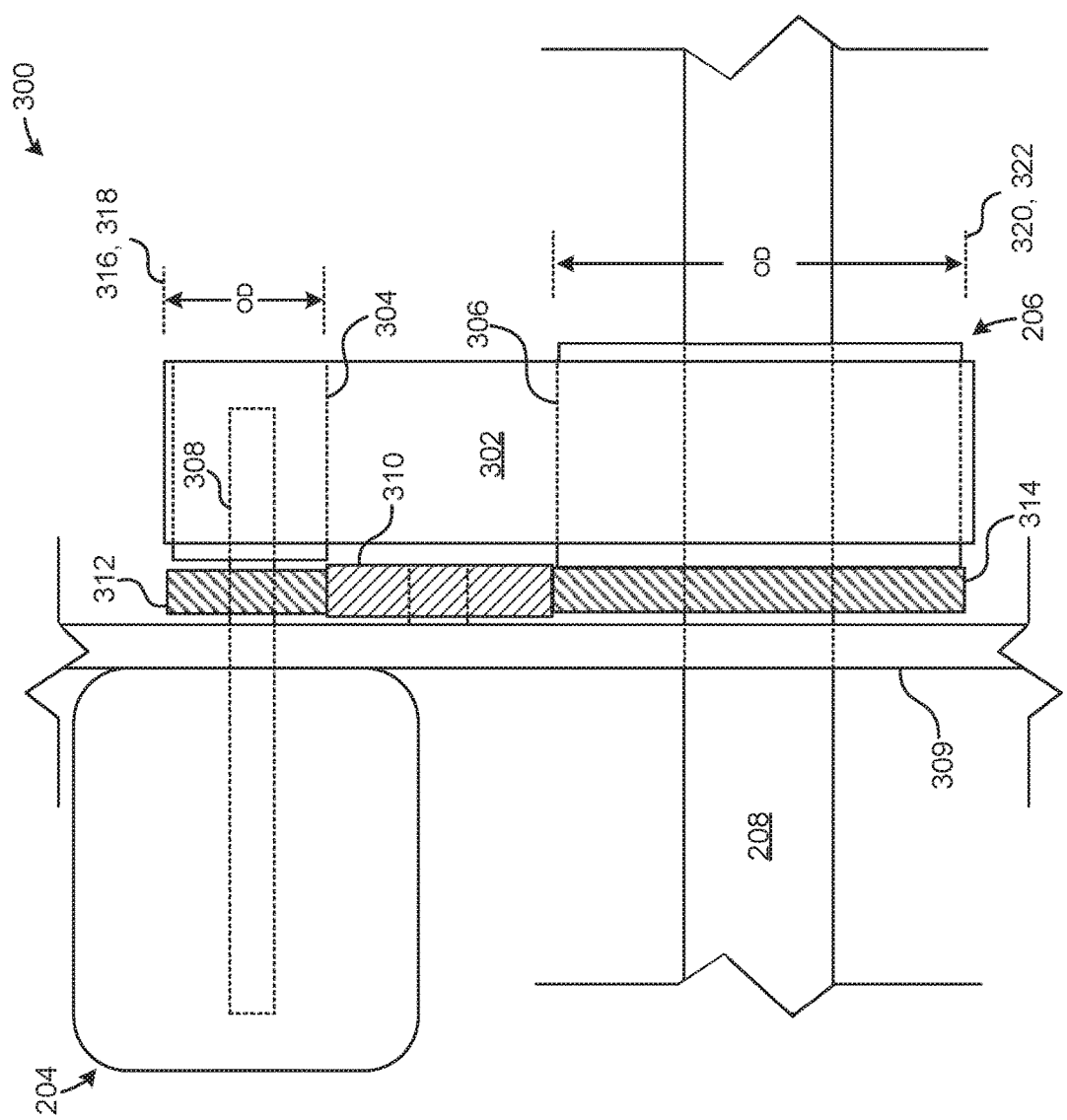
FIG. 3 is a partial cross-sectional view of the example steering system of FIG. 2 along plane A-A and shows an example configuration of steering components in accordance with disclosed examples.

FIG. 3 is a partial cross-sectional view of the example steering system of FIG. 2 along plane A-A and shows an example configuration 300 of steering components in accordance with disclosed examples. According to the illustrated example of FIG. 3, an example belt (e.g., a v-belt, a timing belt, etc.) 302 is operatively coupled to the motor 204 and the actuator 206 to transfer torque therebetween, for example, in response to rotation of the steering wheel 102. In particular, the belt 302 engages a first example pulley 304 associated with the motor 204 and a second example pulley 306 associated with the actuator 206. The first pulley 304 of FIG. 3 is coupled to a shaft 308 of the motor 204 to receive torque from the motor 204. The second pulley 306 is coupled to the actuator 206 to provide torque to the actuator 206 and/or the rack 208.

The motor 204 of FIG. 3 is fixedly coupled to a portion (e.g., an internal portion) 309 of the housing 202 to maintain a position and/or an orientation of the motor 204 when steering the vehicle 100. The actuator 206 is rotatably coupled to the housing 202, for example, via an example bearing 502 (shown in FIG. 5) coupled to the portion 309.

According to the illustrated example, a first example gear (e.g., a spur gear, a helical gear, etc.) 310 is operatively interposed between the motor 204 and the actuator 206 to transfer torque therebetween. In particular, the first gear 310 (e.g., an idler gear) of FIG. 1 is sized, shaped, and/or configured to transfer a torque from the motor 204 to the actuator 206 and/or the rack 208 in response to the belt 302 ceasing to transfer the torque, as discussed further below. In this manner, steering control of the vehicle 100 is maintained when the belt 302 wears, tears, breaks, slips, and/or otherwise disengages from or fails to transfer sufficient torque between the first pulley 304 and/or the second pulley 306.

The first gear 310 of FIG. 3 is operatively coupled to a second gear 312 associated with the motor 204 and a third gear 314 associated with the actuator 206 to transfer torque between the second and third gears 312, 314. The second gear 312 of FIG. 3 is coupled to the shaft 308 and/or the first pulley 304 and the third gear 314 of FIG. 3 is coupled to an exterior portion of the actuator 206 and/or the second pulley 306.

To change a position of the rack 208, the motor 204 generates a torque and imparts the torque on the actuator 206 (e.g., via the belt 302 or the first gear 310) to cause at least a portion (e.g., a portion engaged with the rack 208) of the actuator to rotate, as discussed below in connection with FIG. 5.

In the example of FIG. 3, the second gear 312 has a first outer diameter 316 that is approximately the same as a second outer diameter 318 of the first pulley 304 (as represented by the dotted/dashed lines in FIG. 3), which saves space within the housing 202. For example, the first diameter 316 is between 85% and 115% of the second diameter 318. In other examples, the first diameter 316 is significantly greater than or less than the second diameter 318.

In the example of FIG. 3, the third gear 314 has a third outer diameter 320 that is approximately the same as a fourth outer diameter 322 of the second pulley 306 (as represented by the dotted/dashed lines in FIG. 3), which similarly saves space within the housing 202. For example, the third diameter 320 is between 85% and 115% of the fourth diameter 322. In other examples, the third diameter 320 is significantly greater than or less than the fourth diameter 322.

Figure 4:
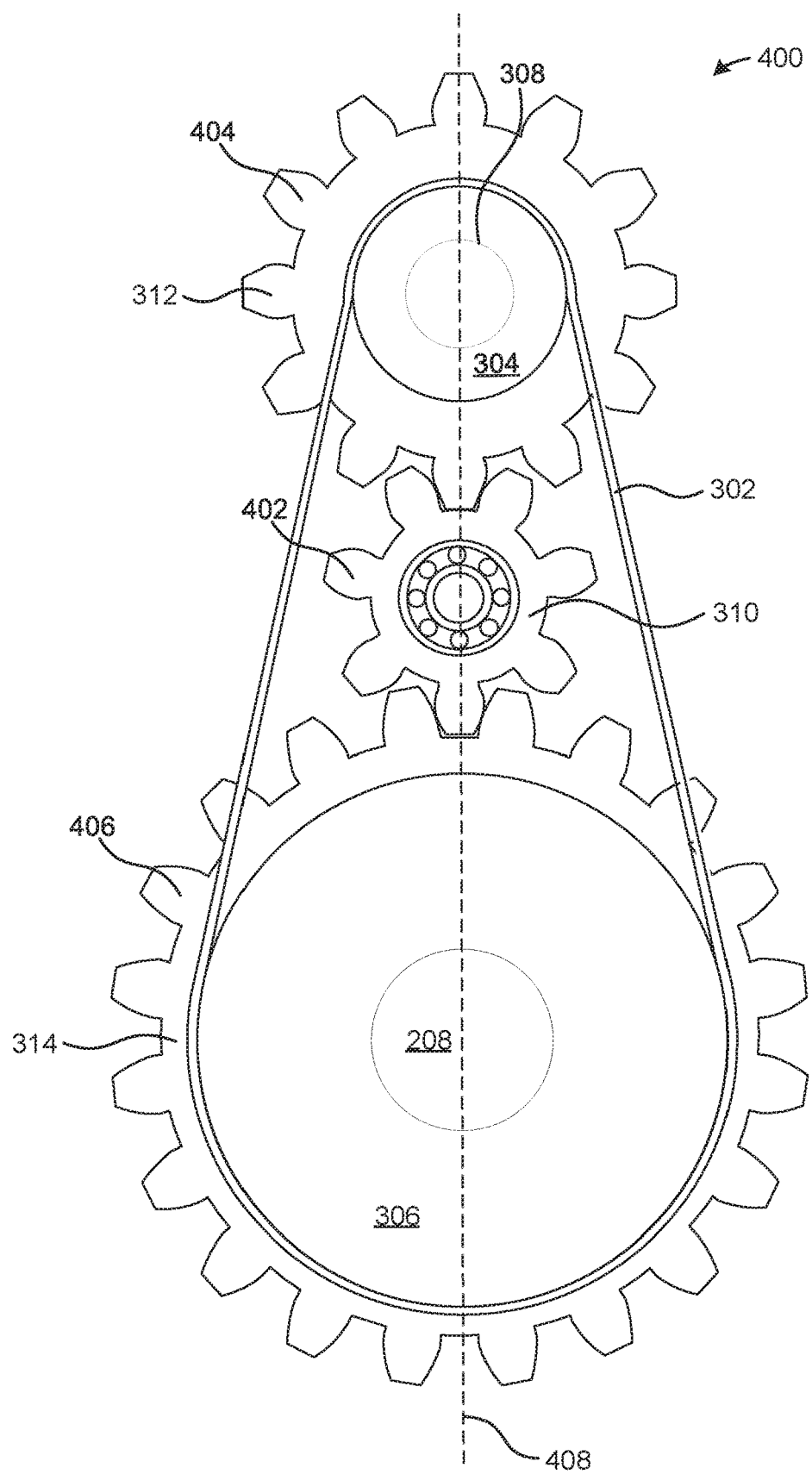
FIG. 4 is a partial view of the example steering components of FIG. 3 in accordance with disclosed examples.

FIG. 4 is a partial view of the example steering components of FIG. 3 in an example configuration 400. According to the illustrated example of FIG. 4, the first gear 310 is disposed between, and operatively coupled to the second gear 312 and third gear 314. In some examples, the first gear 310, second gear 312, and third gear 314 are positioned along (e.g., the respective rotational axes are aligned along) the same axis 408 to save space within the housing 202. In some alternative examples, any one of the first gear 310, second gear 312, third gear 314, or a combination thereof may be offset from the axis 408. The first gear 310, the second gear 312, and the third gear 314 include first teeth 402, second teeth 404, and third teeth 406 respectively. The first teeth 402 of the first gear 310 meshingly engage the second and third teeth 404, 406 of the second and third gears 312, 314. In the illustrated example, the first teeth 402 of the first gear 310 are loosely meshed with the second teeth 404 of the second gear 312 and/or the third teeth 406 of the third gear 314. The loose meshing of the illustrated example ensures that the belt 302 (prior to a failure) is primarily responsible for transferring the torque between the shaft 308 and the rack 208 without any significant added friction from any one of the first gear 310, second gear 312, or third gear 314. Furthermore, the loose meshing of the first gear 310, the second gear 312, and third gear 314 allows for minimized noise resulting from the gear meshing. In some examples, at least one of the first gear 310, the second gear 312, or third gear 314 has a coating (e.g., a plastic coating, a Teflon™ coating, etc.) disposed thereon to further reduce the noise resulting from the gear meshing, for example, when steering the vehicle 100.

In the event that the belt 302 experiences a failure (e.g., wears, tears, breaks, slips, fails and/or otherwise disengages from the first pulley 304 and/or the second pulley 306), the first gear 310 is sized, shaped, and/or configured to transfer a torque from the motor 204 to the actuator 206 and/or the rack 208. In this manner, steering control of the vehicle 100 is maintained when the belt 302 experiences a failure.

Figure 5:
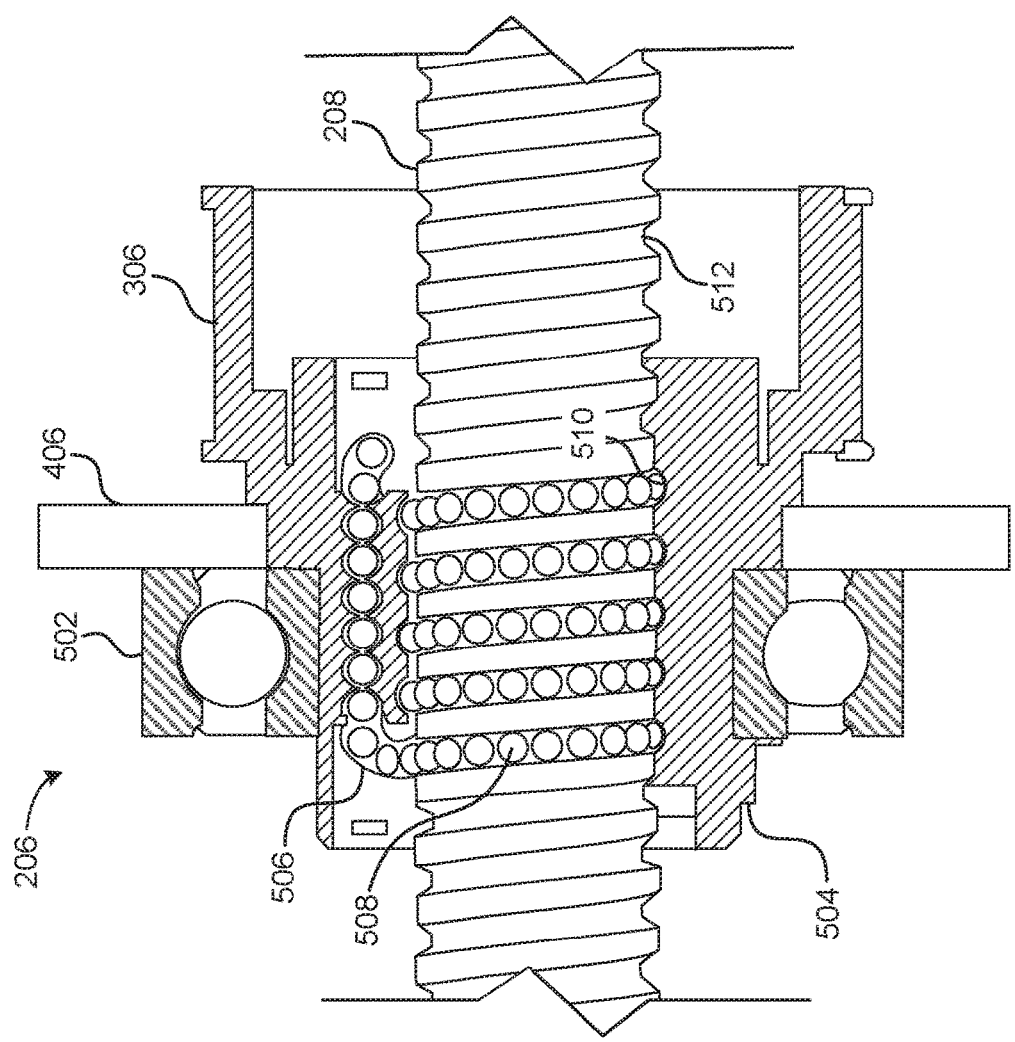
FIG. 5 is a partial cross-sectional view of the example steering system of FIG. 2 along plane B-B and shows an example actuator in accordance with disclosed examples.

FIG. 5 is a partial cross-sectional view of the example steering system of FIG. 2 along plane B-B and shows an example actuator in accordance with disclosed examples. In response to receiving a torque from the motor 204 (e.g., via the belt 302 or the first gear 310 in response to rotation of the steering wheel 102), the second pulley 306 provides the torque to the actuator 206. In the illustrated example, the actuator 206 is rotatably coupled to the housing 202 via a bearing 502 (e.g., a ball bearing) to support radial and axial loads resulting from the provided torque. The actuator 206 includes an example ball nut 504, an example ball return system 506, and a plurality of balls 508. In the illustrated example, the ball return system 506 may be an internal return ball system, an external return ball system, an end cap return system, etc. The example ball nut 504 includes a plurality of first helical grooves 510 with substantially the same radius as a radius of the balls 508. The example rack 208 includes a plurality of second helical grooves 512 with substantially the same radius as a radius of the balls 508. The radius of the first and second helical grooves 510, 512 is substantially the same as the radius of the balls 508 to reduce backlash in response the provided torque. In the illustrated example, the first helical grooves 510 substantially align with the second helical grooves 512 to create a path for the balls 508. The ball nut 504 is rotatably coupled to the rack 208 via the balls 508. In particular, the balls 508 provide the only contact between the ball nut 504 and the rack 208. As the actuator 206 rotates (e.g., in response to rotation of the steering wheel 102), the balls 508 travel through the first and second helical grooves 510, 512 and into the example ball return system 506. In this manner, the balls 508 travel through and exit from the example ball return system 506 and return to the first and second helical grooves 510, 512 in a continuous manner. In the illustrated example, the balls 508 travel a continuous closed circuit as the actuator 206 rotates, allowing the rack 208 to travel in either axial direction 224, 226 as the steering wheel 102 is rotates.

From the foregoing, it will be appreciated that example methods, apparatus and articles of manufacture have been disclosed that enable a first gear to be operatively disposed between a motor and an actuator and, thus, can transfer a torque from the motor to the actuator when a belt experiences a failure mode (e.g., wears, tears, breaks, slips, fails and/or otherwise disengages from the motor and/or actuator). It may be desirable for vehicle steering systems to include redundant mechanical power transfer systems in order to maintain steering control of the vehicle in the event of a failure and ensure the safety of the vehicle and/or passenger(s) of the vehicle. Furthermore, the disclosed first gear can be loosely meshed with second and third gears to minimize friction of the redundant mechanical power transfer system, and to reduce noise when steering the vehicle. An exterior surface of any one of the first gear, the second gear, and the third gear can include a material coating to further reduce noise when steering a vehicle. Example methods, apparatus, and articles of manufacture have been disclosed that provide a redundant power transfer system (e.g., a back-up power transfer system) that reduces noise and, therefore, is unnoticeable to passenger(s) of the vehicle.

The following paragraphs provide various examples disclosed herein. Additionally, several examples have been described throughout this specification. Any features from any example can be included with, a replacement for, or otherwise combined with other features from other examples.

Example 1 includes an apparatus comprising a housing for a vehicle steering system, a motor, an actuator, and a rack disposed in the housing, the motor to provide a torque to the actuator via a belt to translate the rack relative to the housing, and a first gear disposed between the motor and the actuator, the first gear to transfer the torque from the motor to the actuator when the belt does not provide the torque.

Example 2 includes the apparatus of example 1, wherein the first gear engages a second gear and a third gear, the second gear coupled to a shaft of the motor and the third gear coupled to a first pulley of the actuator.

Example 3 includes the apparatus of example 2, wherein the first gear is loosely meshed with the second gear and the third gear to reduce noise when steering a vehicle.

Example 4 includes the apparatus of example 2, wherein the first gear, the second gear, and the third gear are positioned along a same axis.

Example 5 includes the apparatus of example 2, wherein one or more of the first gear, the second gear, or the third gear has a coating of a material disposed thereon to reduce noise when steering a vehicle.

Example 6 includes the apparatus of example 2, wherein the first pulley has an outer diameter that is substantially a same size as an outer diameter of the third gear.

Example 7 includes the apparatus of example 2, wherein the shaft of the motor includes a second pulley to engage the belt, the second pulley having an outer diameter that is substantially a same size as an outer diameter of the second gear.

Example 8 includes a steering system for a vehicle comprising a motor to generate a torque, an actuator operatively coupled to a rack to move the rack based on the torque, the actuator to receive the torque from the motor via a belt, and a first gear operatively coupled to a shaft of the motor and an exterior portion of the actuator, the first gear to provide the torque to the actuator in response to failure of the belt.

Example 9 includes the steering system of example 8, wherein the first gear is operatively coupled to the shaft of the motor via a second gear, the first gear operatively coupled to the exterior portion of the actuator via a third gear, the third gear coupled to a first pulley of the actuator.

Example 10 includes the steering system of example 9, wherein teeth of the first gear are loosely meshed with teeth of the second gear and the third gear to reduce noise when steering a vehicle.

Example 11 includes the steering system of example 9, wherein the first gear, the second gear, and the third gear are positioned along a same axis.

Example 12 includes the steering system of example 9, wherein an exterior surface of at least one of the first gear, the second gear, and the third gear has a material coating to reduce noise when steering the vehicle.

Example 13 includes the steering system of example 9, wherein the first pulley has an outer diameter that is substantially a same size as an outer diameter of the third gear.

Example 14 includes the steering system of example 9, wherein the shaft of the motor includes a second pulley to engage the belt, the second pulley having an outer diameter that is substantially a same size as an outer diameter of the second gear.

Example 15 includes a vehicle comprising a motor operatively coupled to a rack via an actuator to steer the vehicle, the rack to translate based on a torque generated by the motor, and a first gear operatively interposed between the motor and the rack, the first gear to transfer the torque between the motor and the actuator in response to failure of a belt operatively coupled to the motor and actuator.

Example 16 includes the vehicle of example 15, wherein the first gear engages a second gear and a third gear, the second gear coupled to a shaft of the motor and the third gear coupled to a first pulley of the actuator.

Example 17 includes the vehicle of example 16, wherein the first gear is loosely meshed with the second gear and the third gear to reduce noise when steering the vehicle.

Example 18 includes the vehicle of example 16, wherein one or more of the first gear, the second gear, or the third gear has a coating of a material disposed thereon to reduce noise when steering a vehicle.

Example 19 includes the vehicle of example 16, wherein the first pulley has an outer diameter that is substantially a same size as an outer diameter of the third gear.

Example 20 includes the vehicle of example 16, wherein the shaft of the motor includes a second pulley to engage the belt, the second pulley having an outer diameter that is substantially a same size as an outer diameter of the second gear.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a housing for a vehicle steering system;
   a motor, an actuator, and a rack disposed in the housing, the motor to provide a torque to the actuator via a belt to translate the rack relative to the housing, the actuator rotatably coupled to the housing via a bearing, the bearing adjacent to a third gear coupled to a first pulley of the actuator; and
   a first gear disposed between the motor and the actuator, the first gear to transfer the torque from the motor to the actuator when the belt does not provide the torque.

2. The apparatus of claim 1, wherein the first gear engages a second gear and the third gear, the second gear coupled to a shaft of the motor.

3. The apparatus of claim 2, wherein the first gear is loosely meshed with the second gear and the third gear to reduce noise when steering a vehicle.

4. The apparatus of claim 2, wherein the first gear, the second gear, and the third gear are positioned along a same axis.

5. The apparatus of claim 2, wherein one or more of the first gear, the second gear, or the third gear has a coating of a material disposed thereon to reduce noise when steering a vehicle.

6. The apparatus of claim 2, wherein the first pulley has an outer diameter that is substantially a same size as an outer diameter of the third gear.

7. The apparatus of claim 2, wherein the shaft of the motor includes a second pulley to engage the belt, the second pulley having an outer diameter that is substantially a same size as an outer diameter of the second gear.

8. A steering system for a vehicle, comprising:
   a motor to generate a torque;
   an actuator operatively coupled to a rack to move the rack based on the torque, the actuator to receive the torque from the motor via a belt, the actuator rotatably coupled to a housing via a bearing, the bearing adjacent to a third gear coupled to a first pulley of the actuator; and
   a first gear operatively coupled to a shaft of the motor and an exterior portion of the actuator, the first gear to provide the torque to the actuator in response to failure of the belt.

9. The steering system of claim 8, wherein the first gear is operatively coupled to the shaft of the motor via a second gear, the first gear operatively coupled to the exterior portion of the actuator via the third gear.

10. The steering system of claim 9, wherein teeth of the first gear are loosely meshed with teeth of the second gear and the third gear to reduce noise when steering a vehicle.

11. The steering system of claim 9, wherein the first gear, the second gear, and the third gear are positioned along a same axis.

12. The steering system of claim 9, wherein an exterior surface of at least one of the first gear, the second gear, and the third gear has a material coating to reduce noise when steering the vehicle.

13. The steering system of claim 9, wherein the first pulley has an outer diameter that is substantially a same size as an outer diameter of the third gear.

14. The steering system of claim 9, wherein the shaft of the motor includes a second pulley to engage the belt, the second pulley having an outer diameter that is substantially a same size as an outer diameter of the second gear.

15. A vehicle, comprising:
    a motor operatively coupled to a rack via an actuator to steer the vehicle, the rack to translate based on a torque generated by the motor, the actuator rotatably coupled to a housing via a bearing, the bearing adjacent to a third gear coupled to a first pulley of the actuator; and
    a first gear operatively interposed between the motor and the rack, the first gear to transfer the torque between the motor and the actuator in response to failure of a belt operatively coupled to the motor and actuator.

16. The vehicle of claim 15, wherein the first gear engages a second gear and the third gear, the second gear coupled to a shaft of the motor.

17. The vehicle of claim 16, wherein the first gear is loosely meshed with the second gear and the third gear to reduce noise when steering the vehicle.

18. The vehicle of claim 16, wherein one or more of the first gear, the second gear, or the third gear has a coating of a material disposed thereon to reduce noise when steering a vehicle.

19. The vehicle of claim 16, wherein the first pulley has an outer diameter that is substantially a same size as an outer diameter of the third gear.

20. The vehicle of claim 16, wherein the shaft of the motor includes a second pulley to engage the belt, the second pulley having an outer diameter that is substantially a same size as an outer diameter of the second gear.

* * * * *